R. GRANT AND J. S. R. RIGBY.
TRANSMISSION MECHANISM.
APPLICATION FILED MAR. 31, 1920. RENEWED APR. 18, 1922.

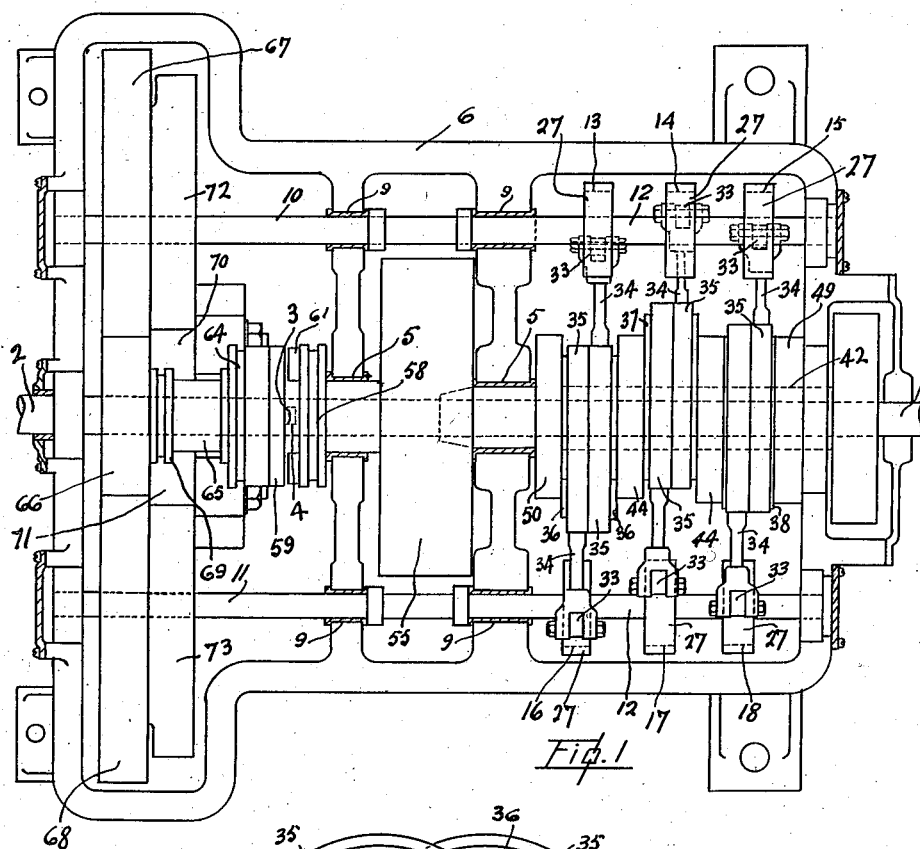

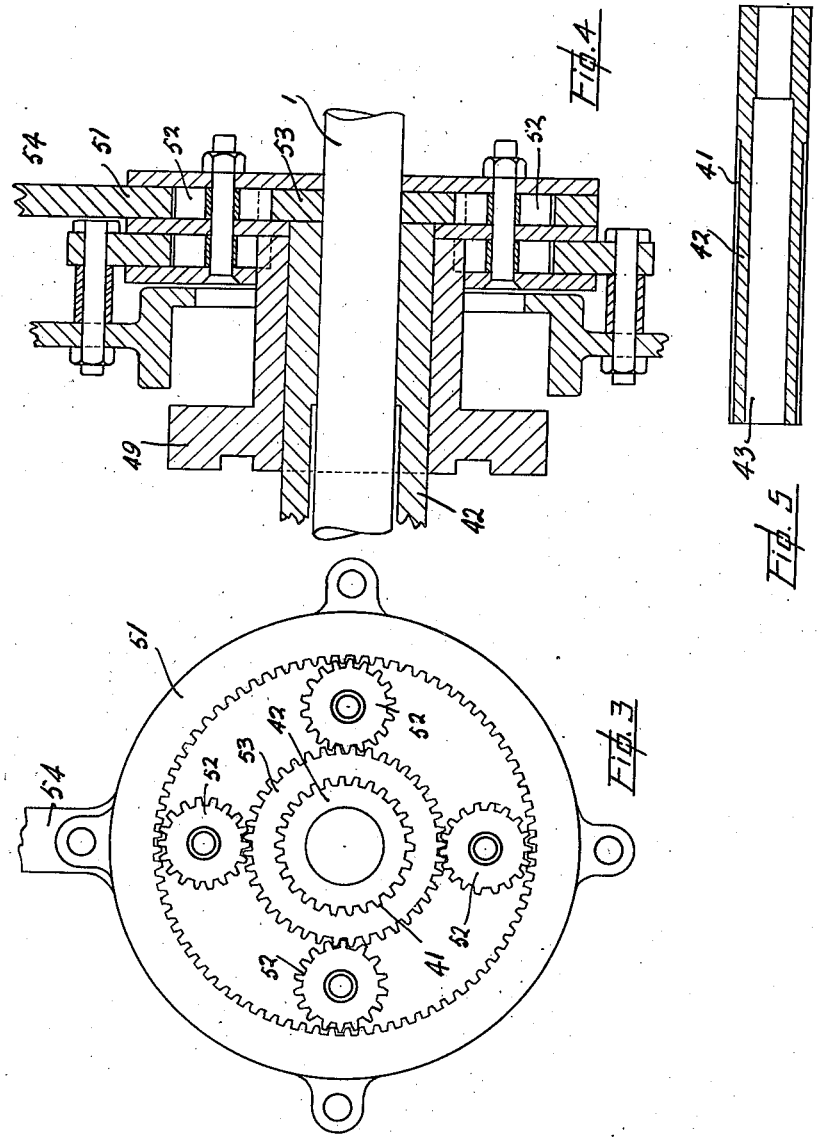

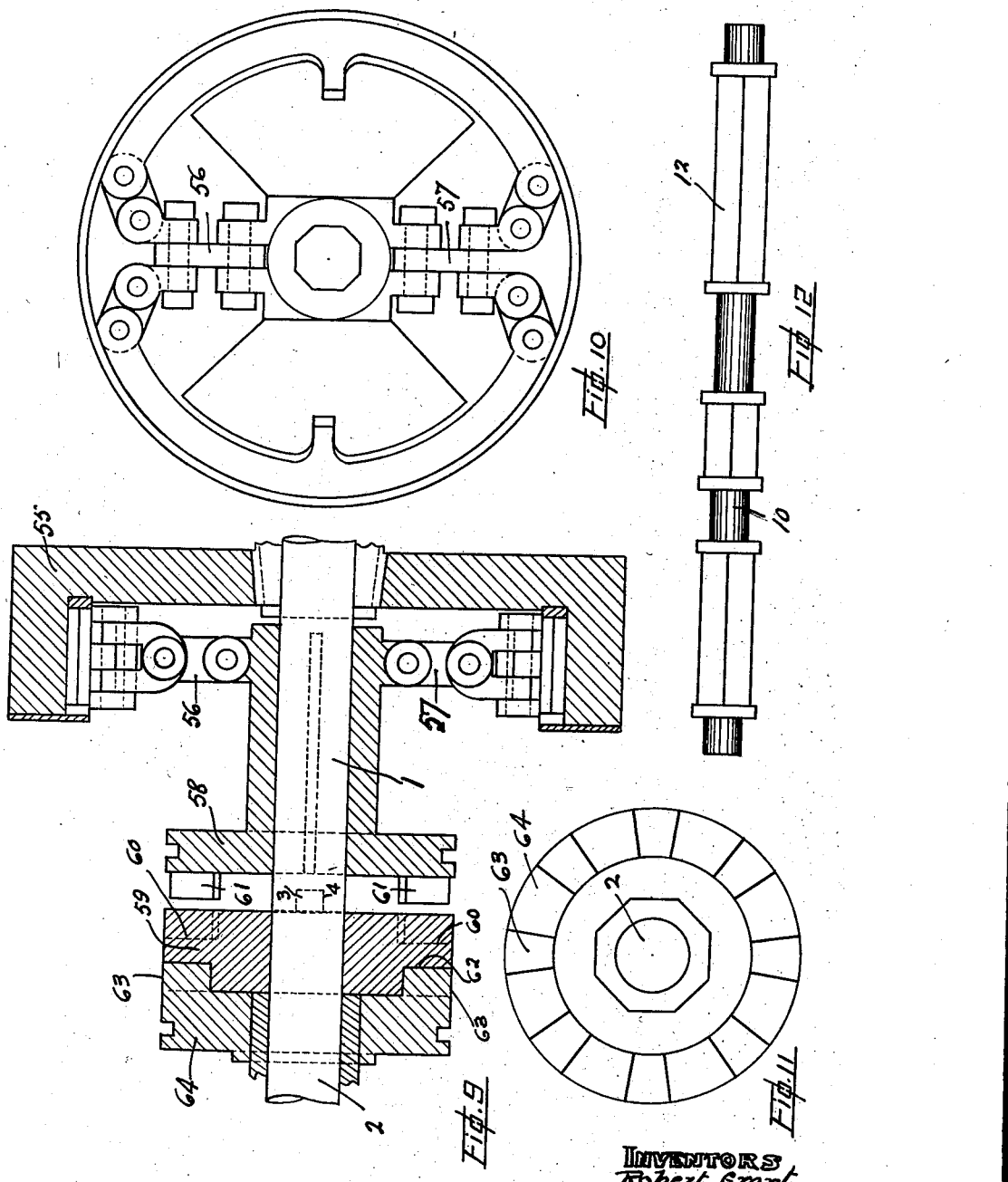

1,418,254.

Patented May 30, 1922.

INVENTORS
Robert Grant.
Joseph Stanley Russell Rigby
BY
ATT'YS.

UNITED STATES PATENT OFFICE.

ROBERT GRANT AND JOSEPH STANLEY RUSSELL RIGBY, OF VANCOUVER, BRITISH COLUMBIA, CANADA.

TRANSMISSION MECHANISM.

1,418,254.  Specification of Letters Patent.  Patented May 30, 1922.

Application filed March 31, 1920, Serial No. 370,116. Renewed April 18, 1922. Serial No. 555,224.

*To all whom it may concern:*

Be it known that we, ROBERT GRANT and JOSEPH STANLEY RUSSELL RIGBY, both subjects of the King of Great Britain, and residents of the city of Vancouver, in the Province of British Columbia, Canada, have invented certain new and useful Improvements in Transmission Mechanism, of which the following is a specification.

Our invention relates to improvements in transmission mechanism, and the object of our invention is to devise an efficient mechanism for transmitting motion from one shaft to another, such as in the drive of an automobile, which mechanism is smooth and flexible in operation, working without jar and noise, is adapted to act as a clutch and transmission gear combined, and is capable of driving the driven shaft at variable speeds at the will of the operator without varying the normal speed of the driving shaft. A further object is to devise a transmission gear by means of which the driven shaft may be rotated in either direction in a simple practical manner.

We attain these objects by the construction illustrated in the accompanying drawings in which—

Fig. 1 is a plan view of the mechanism.

Fig. 2 is a side view showing the counter shaft drive.

Fig. 3 is a face view of the internal gear and associated mechanism.

Fig. 4 is a sectional view of Fig. 3 taken through the vertical centre line.

Fig. 5 is a view of the eccentric adjusting sleeve.

Fig. 9 is a sectional view of the friction clutch.

Fig. 10 is a face view of the clutch of Fig. 9.

Fig. 11 is a face view of one of the driving clutches.

Fig. 12 is a detail view of a counter shaft.

Figure 20:
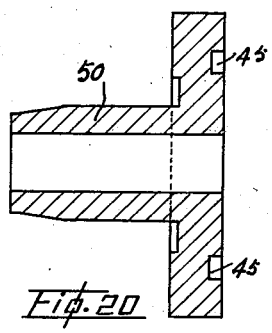
Figure 21:
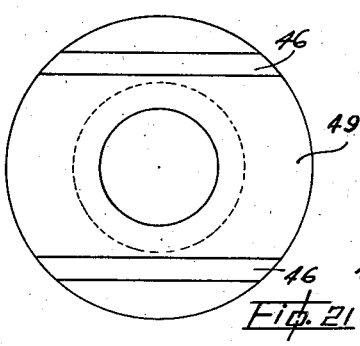
Figure 22:
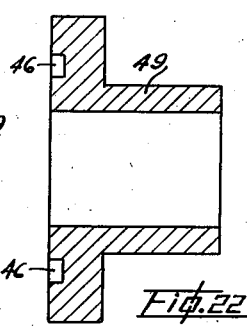

Figs. 20, 21, and 22 are details of the eccentric guides, clutch end, and front end respectively.

Similar figures of reference indicate similar parts throughout the several views.

The shaft through which the power is transmitted from the engine to the axle is divided and for the purpose of this specification the divided parts are hereinafter termed the "driving" and "driven" shafts respectively. These shafts, indicated by the numerals 1 and 2, are brought together at their divided ends, however, shaft 2 being provided with a centre pin extension 3 adapted to fit rotatably in a corresponding recess 4 formed in the end of shaft 1 and the separable continuous main shaft so formed is rotatably mounted in suitable bearings 5 carried by a base plate 6 provided with a suitable cover 7, the base and cover forming a gear case 8 in which the shaft and the mechanism associated therewith and hereinafter described are completely enclosed, the opposite ends of the driving and driven shafts extending through the ends of the case for connection to the motor and axle respectively.

Figure 6:
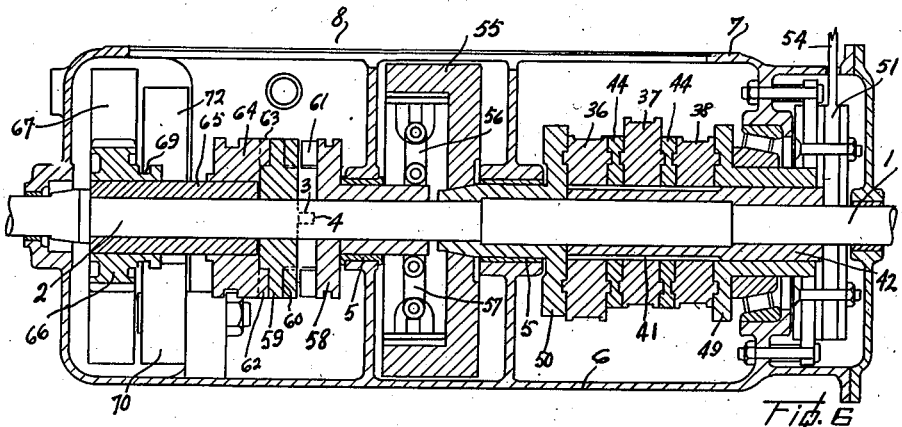
Fig. 6 is a longitudinal sectional elevation of the mechanism.
Figure 7:
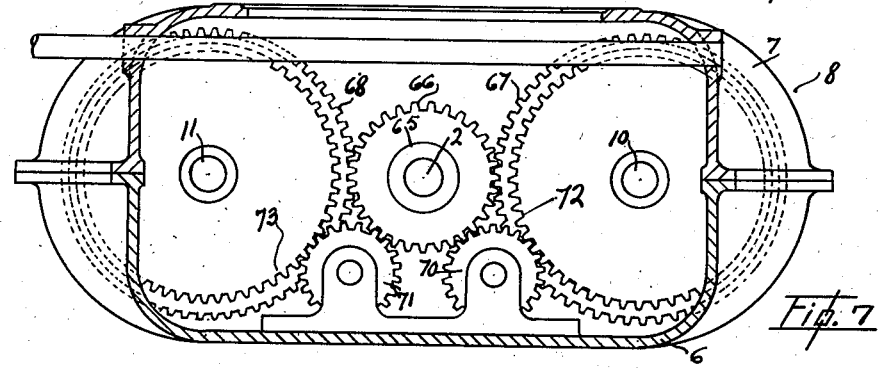
Fig. 7 is an end view showing the driving gears.
Figure 8:
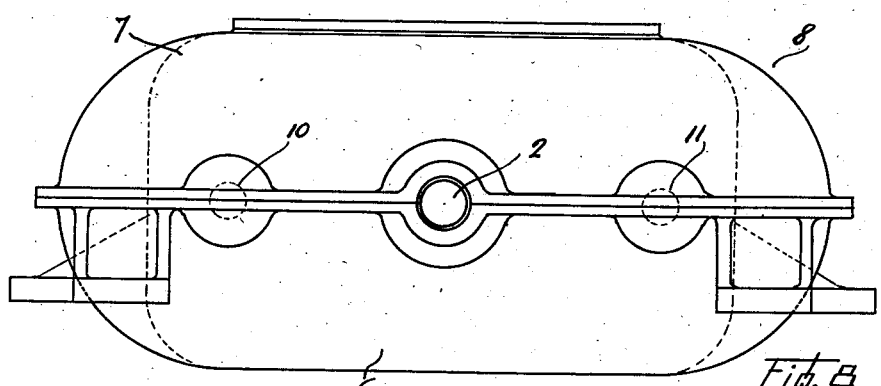
Fig. 8 is an end view of the casing enclosing the mechanism.
Figure 13:
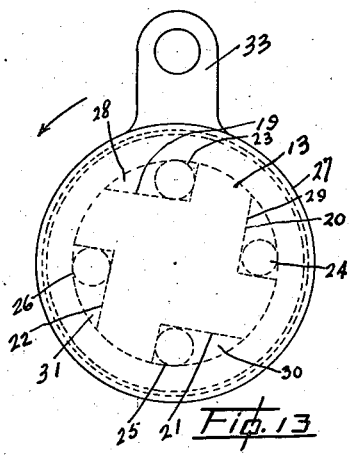
Figs. 13, 14, 15 and 16 are details of a roller clutch.
Figure 14:
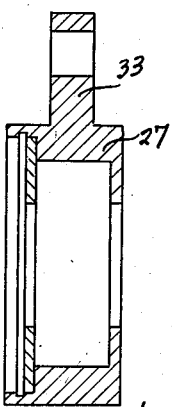
Figure 15:
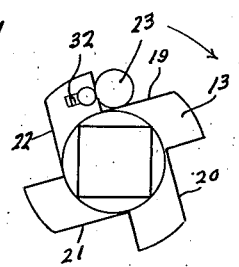
Figure 16:
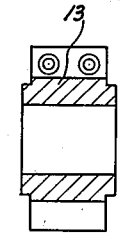

Rotatably mounted in bearings 9 and extending longitudinally of the gear case 8 parallel with the main shaft and on opposite sides of it are counter shafts 10 and 11 on each of which toward their forward ends, which are squared as at 12, are secured disks 13—14—15 and 16—17—18 respectively, the peripheries of which are cut away at four equidistant points to form seats 19, 20, 21 and 22 adapted to receive rollers 23, 24, 25 and 26 as shown in Figs. 13 and 15, and on each disk are rotatably mounted annular rings, indicated by the numeral 27, from which it will be seen that pockets 28, 29, 30, and 31, as shown in Fig. 13, are formed in which the rollers 23, 24, 25 and 26 are contained and that these pockets taper outwardly so that they are in effect wedge-shaped, the disks, rollers, and rings constituting what are termed hereinafter "roller clutches." Springs 32, indicated in Fig. 15, are provided to maintain the rollers in frictional contact with the inner peripheries of the annular rings 27, while the rings are each provided with a lug 33 to which are connected respectively the jawed ends of eccentric rods 34, the opposite ends of which rods are respectively secured to eccentric straps 35, for actuating the roller clutches on the right and left hand respectively.

Figure 17:
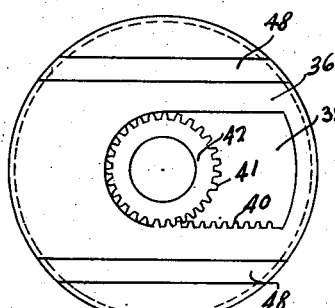
Figs. 17 and 18 are details of an eccentric sheave.
Figure 18:
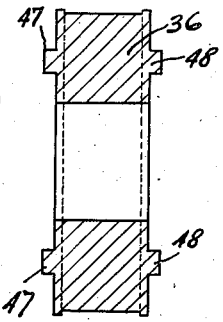
Figure 19:
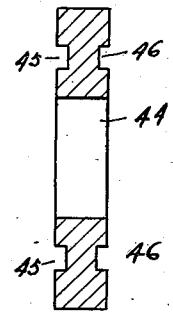
Fig. 19 is a sectional view of the idler between eccentric sheaves.

These eccentric straps are mounted in pairs for actuating respectively the right and left hand counter shafts, as shown in Fig. 1, on eccentric sheaves 36, 37 and 38, which sheaves are slotted horizontally, as indicated at 39 in Fig. 17, the lower edge of the slot being provided with teeth 40 with which mesh teeth 41 formed on the periphery of a sleeve 42, rotatably mounted on the shaft 1, the sleeve teeth being cut longitudinally of such length that all the eccentric sheaves may be mounted on the toothed portion indicated by the numeral 43 of Fig. 5, from which it will be seen that rotation of the sleeve in opposite directions increases or decreases the throw of the eccentrics. Idler discs 44 are fitted between and attached to the respective eccentric sheaves, being provided with grooves 45 and 46 adapted to engage ribs 47 and 48 formed on the sides of the sheaves, while similarly engaged to the front and rear end sheaves respectively are front and rear eccentric guides 49 and 50 shown particularly in detail in Figs. 20, 21 and 22. On the front eccentric guide 49 is supported the mechanism for controlling the throw of the eccentrics, consisting principally of an internal gear 51 operating through a series of suitably mounted idlers 52, on a gear 53 secured to the end of the sleeve 42, so that by moving the gear 51 in either direction by means of an arm 54 with which it is provided, the sleeve 42 is also turned in the corresponding directions, as the case may be. The rear end of the rear eccentric guide is secured to the drum 55 of an approved friction clutch preferably of the kind shown in Fig. 9, that is, in which the drum is rotated by the spreading of the arms 56 and 57 secured to a male clutch member 58 slidably mounted on the driving shaft 1 and rotatable therewith, the rotation of the drum ceasing on the collapse of the arms, the operation of the arms to spread or collapse being effected by moving the clutch member 58 forwardly or rearwardly respectively by means of a suitable clutch lever, not shown on account of such construction being well-known to those skilled in the art. 59 indicates a female clutch member secured to the driven shaft 2 provided on its forward side with recesses 60 adapted to receive the teeth 61 of the clutch 58 when the latter is moved rearwardly, as hereinafter described, this clutch member 59 being also provided on its rear side with similar recesses 62 adapted to receive the teeth 63 of a male clutch member 64 operated similarly to clutch member 58, slidably connected to a sleeve 65 mounted freely on the driven shaft, on the rear end of which sleeve is slidably secured a gear 66 meshing when in its rearmost position with gears 67 and 68 secured respectively to the counter shafts 10 and 11, this gear 66, however, being capable of being moved forwardly on the driven shaft by means of a suitable lever engaging the collar 69, with which it is provided after the manner of clutch operation, to mesh with idlers 70 and 71 meshing with gears 72 and 73 also secured to the counter shafts and preferably formed integrally with the gears 67 and 68 but of less diameter than the same.

The operation of the mechanism will be readily understood and may be briefly described: When it is desired to rotate the driven shaft 2 at variable speeds the arms 56 and 57 are spread by moving the clutch member 58 forwardly so that they grip the inner periphery of the friction clutch drum 55 which then rotates with the rotating driving shaft 1. The rotating clutch then rotates the rear eccentric guide 50 which in turn rotates coincidently the eccentric sheaves 36, 37 and 38 and the idlers 44, thus causing reciprocation of the rods 34 the reciprocation of which causes rotation of the roller clutches through the trappings of the rollers at each inward stroke of the respective rods, as it will be seen that partial rotation of each annular ring 27 on the inward stroke tends to carry the respective rollers into the tapering end of its pocket due to the friction between the roller and the inner periphery of the ring, the friction being relieved on the return of the roller into the wide end of the pocket on the outstroke of the rod so that absolute freedom of movement is secured on the outstrokes of the respective rods. As each clutch only partially rotates the respective counter shafts at each operation the complete rotation of the shaft is effected by placing a number of clutches thereon, which come into operation successively, and the speed of rotation is varied according to the amount of eccentricity or throw given to the eccentric sheaves through the actuation of the internal gear 51, as already described. The counter shafts being thus rotated the gears 67 and 68 are also rotated and these in turn rotate the gear 66, sleeve 65, clutch 64, clutch 59 and consequently the driven shaft 2, from which it will be seen that the speed of the same may be readily controlled at the will of the operator by simply moving the internal gear 51 as required. The reverse drive of shaft 2 is obtained by moving the gear 66 forward to mesh with the idlers 70 and 71 and the drive is then transmitted to the shaft through the gears 72 and 73, the idlers 70 and 71, and the gear 66, the interposition of the idlers causing the gear 66 to rotate in the opposite direction to that of the ahead drive.

Should a direct drive be required at engine speed the arms 56 and 57 of the friction clutch 58 are collapsed by moving the clutch 58 rearwardly so that the drum 55, sleeve 42 and the eccentrics cease rotating, the rearward movement of the clutch carrying its teeth 61 into the recesses 60 of the female clutch 59 and at the same time the teeth 63 of clutch 64 are disengaged from the recesses 62 by moving clutch 64 rearwardly, from which it will be seen that the driving and driven shafts 1 and 2 are now united as a continuous shaft through clutches 58 and 59 and are driven direct from the motor, the transmission mechanism in this case remaining entirely at rest.

From the foregoing it will be seen that we have devised a highly efficient, smooth working, and noiseless transmission mechanism, capable of being employed with great facility for transmitting power at various speeds in either forward or reverse directions without altering the speed of the motor, which may be rendered inoperative at will to permit a direct drive to be obtained when desired.

What we claim as our invention is:—

1. In transmission mechanism, the combination with the driving shaft and driven shaft, of a central gear mounted on said driven shaft to be rotatable therewith and capable of lateral slidable movement thereon, rotatably mounted gears engaging said central gear, rotatably mounted gears adjacent said first-mentioned gears and normally out of engagement with said central gear, idler gears normally engaging said second-mentioned gears and into mesh with which the said central gear may be carried by lateral slidable movement, and mechanism adapted for engagement with the driving shaft by which its drive is transmitted by a series of successive impulses to said first and second-mentioned gears coincidently whereby rotation of said central gear is effected in either direction when moved laterally to mesh respectively with the said gears.

2. In transmission mechanism, the combination with the driving shaft and driven shaft, of a female clutch member secured to the end of the driven shaft adjacent the end of the driving shaft, a sleeve freely mounted on said driven shaft, a male clutch member slidably secured to said sleeve capable of being carried into or out of engagement with said female clutch, a central gear slidably secured to said sleeve and laterally movable thereon, rotatably mounted gears engaging said central gear, and mechanism adapted for engagement with the driving shaft by which its drive is transmitted by a series of impulses successively to said gears and sleeve whereby rotation or non-rotation of the driven shaft may be controlled by the respective engagement or disengagement of said clutches.

3. In transmission mechanism, the combination with the driving shaft and driven shaft, of a central gear mounted on the driven shaft to be rotatable therewith, rotatably mounted countershafts provided with gears normally engaging said central gear, a series of discs secured to each countershaft each provided with cut-out portions spaced equidistant circumferentially, an annular ring movably mounted on each disc periphery, the said rings and cut-out portions forming wedge-shaped pockets tapering outwardly, a roller in each such pocket in frictional contact with its respective annular ring, a toothed sleeve freely mounted on said driving shaft having a gear at its forward end, sheaves mounted on said sleeve provided with eccentric slots toothed on one edge the teeth of which mesh with the sleeve teeth, there being one sheave for each annular ring, straps mounted on each sheave, a rod connection between each sheave strap and its respective annular ring, a front end and a rear end sleeve freely mounted on the driving shaft, a driving connection between said sleeves and said sheaves, a friction clutch mounted on the rear end sleeve, the setting and releasing means of which are slidably secured to the driving shaft, and an internal gear device mounted on the front end sleeve adapted to co-act with the toothed sleeve gear and operate the same.

4. In transmission mechanism, the combination with the driving shaft and driven shaft, of a female clutch member secured to the end of the driven shaft adjacent the end of the driving shaft, a sleeve freely mounted on said driven shaft, a male clutch member slidably secured to said sleeve capable of being carried into or out of engagement with said female clutch, a central gear slidably secured to said sleeve and laterally movable thereon, rotatably mounted countershafts provided with gears normally engaging said central gear, each countershaft gear being provided on one side with another gear, idlers with which said second-mentioned gears mesh and into engagement with which said central gear may be carried, a series of discs secured to each countershaft each provided with cut-out portions spaced equidistant circumferentially, an annular ring movable mounted on each disc periphery, the said rings and cut-out portions forming wedge-shaped pockets tapering outwardly, a roller in each such pocket in frictional contact with its respective annular ring, a toothed sleeve freely mounted on said driving shaft having a gear at its forward end, sheaves mounted on said sleeve provided with eccentric slots toothed on one edge the teeth of which mesh with the sleeve teeth, there being one sheave for each annular ring, straps mounted on each sheave, a rod connection between each sheave strap and its respective annular ring, a front end and a rear end sleeve freely mounted on the driving shaft, a driving connection between said sleeves and said sheaves, a friction clutch mounted on said rear end sleeve, the setting and releasing means of which are slidably secured to the driving shaft, and an internal gear device mounted on said front end sleeve adapted to co-act with the toothed sleeve gear and operate the same.

5. Means for transmitting motion from a drive to a driven shaft, comprising a series of interlocked eccentric disks freely mounted on the drive shaft, a series of driven clutches on the driven shaft, eccentric straps operatively connecting said clutches and disks, a sleeve normally free on said drive shaft and having a drive connection with one of said disks and releasable means for clutching the sleeve to the drive shaft to rotate therewith, said means comprising a friction drum carried by the sleeve, a member slidable on the drive shaft and drum engaging means carried by said member adapted to engage the drum upon movement of the member in one direction and to be disengaged with the drum upon movement of the member in the opposite direction.

6. Means for transmitting motion from a drive shaft to a counter shaft comprising a toothed sleeve rotatable on the drive shaft and a series of interlocked eccentric discs having toothed slots receiving the sleeve therethrough, a clutch establishing driving connection between the eccentric disks and the driving shaft, driving clutches on the counter shaft, eccentric straps operatively connected between said clutches and discs, and means for varying the throw of said discs comprising a gear on the toothed sleeve, a series of idler gears meshing with said sleeve gear, and an internal ring gear meshing with said idler gears.

Dated at Vancouver, B. C., this 19th day of March, 1920.

ROBERT GRANT.
JOSEPH STANLEY RUSSELL RIGBY.